United States Patent
Zentic

(10) Patent No.: US 9,482,345 B2
(45) Date of Patent: Nov. 1, 2016

(54) SEALING ARRANGEMENT FOR A ROTATING SHAFT

(71) Applicant: Clint Zentic, Sealy, TX (US)

(72) Inventor: Clint Zentic, Sealy, TX (US)

(73) Assignee: Sulzer Management AG, Winterthur (CH)

( * ) Notice: Subject to any disclaimer, the term of this patent is extended or adjusted under 35 U.S.C. 154(b) by 762 days.

(21) Appl. No.: 13/645,181

(22) Filed: Oct. 4, 2012

(65) Prior Publication Data

US 2014/0097573 A1    Apr. 10, 2014

(51) Int. Cl.
| | | |
|---|---|---|
| *F01D 11/04* | (2006.01) | |
| *F01D 11/06* | (2006.01) | |
| *F16J 15/34* | (2006.01) | |

(52) U.S. Cl.
CPC ................................ *F16J 15/3404* (2013.01)

(58) Field of Classification Search
CPC ...... F16J 15/3404; F16J 15/40; F16J 15/406; F16J 15/42; F16J 15/43
USPC ................ 277/385, 401, 431, 432
See application file for complete search history.

(56) References Cited

U.S. PATENT DOCUMENTS

| | | | |
|---|---|---|---|
| 3,176,996 A | | 4/1965 | Barnett |
| 5,769,427 A | * | 6/1998 | Ostrowski ............ F04D 29/128 277/318 |
| 2005/0230106 A1 | * | 10/2005 | Mahoney et al. ......... 166/244.1 |
| 2008/0260539 A1 | * | 10/2008 | Stinessen et al. ............. 417/26 |
| 2010/0015000 A1 | * | 1/2010 | Andrews et al. ............... 418/88 |
| 2012/0027564 A1 | * | 2/2012 | Felix ................................ 415/1 |

FOREIGN PATENT DOCUMENTS

FR    2139228 A5    1/1973

OTHER PUBLICATIONS

Extended European Search Report mailed Jan. 29, 2014, from European Application No. 13182826.1 (6 pages).
Red R Paley et al., "SULZ Gas Transport Without Pipelines," Dec. 31, 2006, pp. 8-10, XP05509722, http://www.sulzer.com/en/-/media/Documents/Cross_Division/STR/2006/2006_3_8_paley_e.pdf.

* cited by examiner

*Primary Examiner* — Vishal Patel
*Assistant Examiner* — Stacy Warren
(74) *Attorney, Agent, or Firm* — Kilpatrick Townsend & Stockton LLP

(57) ABSTRACT

The invention relates to a sealing system, in particular for sealing pump shafts of vertically arranged pumps for conveying liquefied natural gas (LNG) or other cryogenic fluids below −80° C. The sealing system has a mechanical seal arrangement. A barrier fluid flows through the mechanical seal arrangement at a barrier fluid pressure. The mechanical seal arrangement prevents a sealing fluid from exiting a sealing chamber. The barrier fluid pressure is higher than a sealing fluid pressure in the sealing chamber.

13 Claims, 1 Drawing Sheet

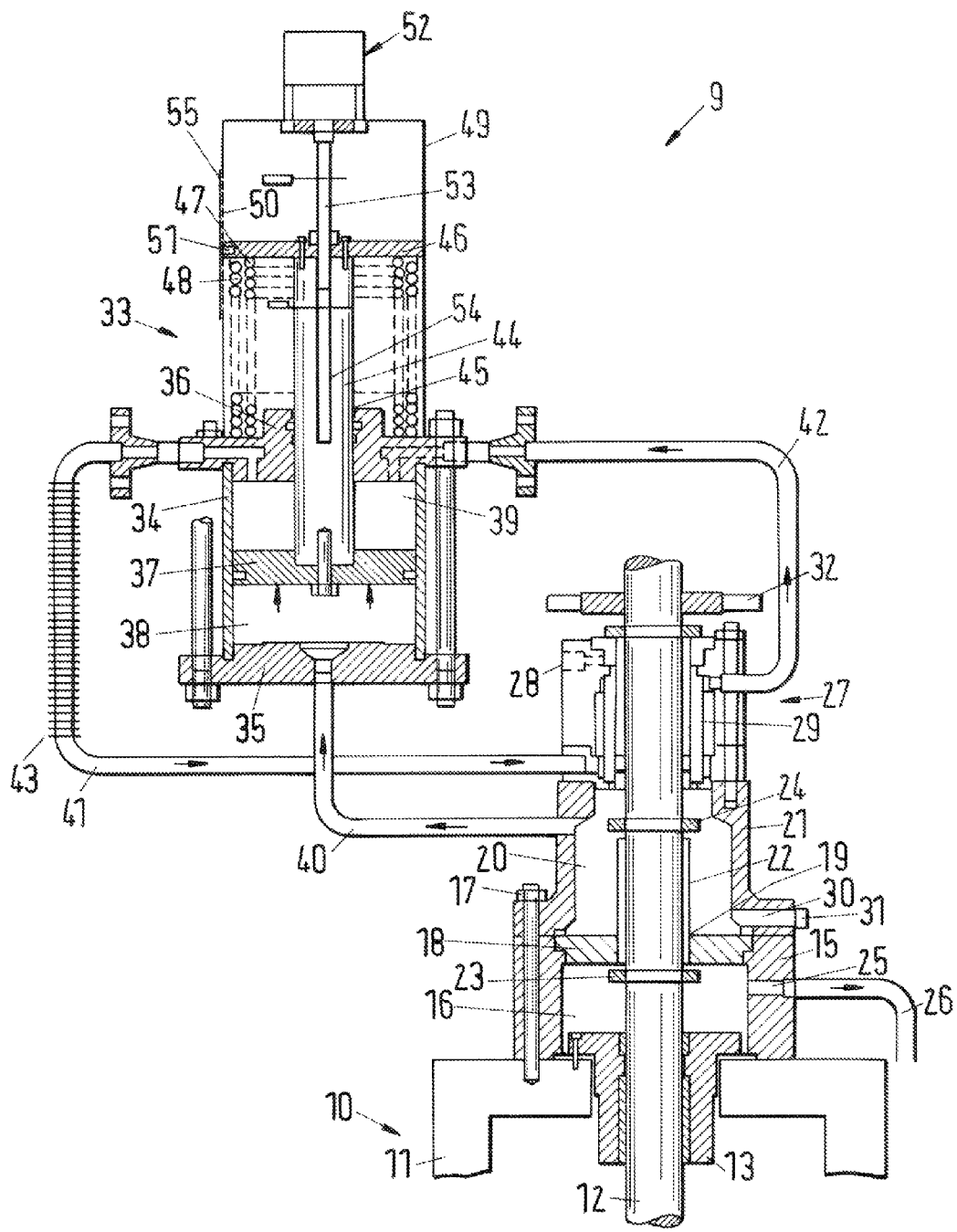

SEALING ARRANGEMENT FOR A ROTATING SHAFT

BACKGROUND OF THE INVENTION

The invention relates to a sealing system for sealing a rotating shaft projecting through a sealing chamber.

A sealing system of this category has already been offered and sold by Sulzer Pumpen AG for some years under the sales name "J-Unit Cryogenic Sealing System".

This sealing system is in particular used for sealing pump shafts of vertically arranged pumps for conveying for example liquefied natural gas (LNG). Liquefied natural gas has a temperature of approximately −160° C. so that standard sealing arrangements cannot easily be used. This sealing system is in particular characterized in that the cold liquefied natural gas is separated from the mechanical seal arrangement exerting the sealing function. This is achieved in that no liquefied natural gas is located in a sealing chamber adjoining the mechanical seal arrangement, but rather natural gas which has a much higher temperature than the liquefied natural gas. Standardized and thus tested and comparatively inexpensive shaft seals, in particular mechanical seals, can thus be used.

The named seal system is in this respect designed as a so-called add-on system. It is understood by this that the sealing system can be attached to a standard pump. For the named reasons, it is in particular suitable for use in the conveying of cold liquids, for example cryogenic fluids with a temperature below −80° C. It can, however, also be used at pumps which convey other liquids. A use is always advantageous when it has to be ensured that the conveyed liquid, which can, for example, be easily flammable or toxic, does not escape from the pump into the environment.

The named sealing system for sealing a rotating shaft projecting through a sealing chamber has a mechanical seal arrangement which is passed through by a barrier fluid at a barrier fluid pressure. A sealing fluid in gaseous state is present in the sealing chamber, in particular in gaseous form, whose exit should be prevented by the sealing system. The sealing fluid can be natural gas, for example.

The mechanical seal arrangement is supplied with barrier fluid by a barrier fluid pressure device. The barrier fluid pressure device has a cylinder in which a displaceable pressure piston is arranged which divides the cylinder into a region filled with sealing fluid in gaseous state and a region filled with and flowed through by barrier fluid. The pressure piston is thus arranged in the cylinder such that a sealing fluid space is formed between the pressure piston and a first cylinder end cover in which the sealing fluid pressure acts and a barrier fluid space is formed between the pressure piston and a second cylinder end cover which is flowed through by the barrier fluid. A force can be applied to the region filled with barrier fluid by means of the pressure piston and the barrier fluid pressure can thus be set. The barrier fluid pressure is in this respect greater by a fixed pressure difference than a sealing fluid pressure of the sealing fluid acting in the sealing chamber. The fixed pressure difference is achieved in that, on the one hand, as described above, the sealing fluid pressure and additionally an additional force act on the pressure piston. The additional force is applied by a spring which is arranged in the region of the cylinder filled with barrier fluid. The additional force in this respect acts on the pressure piston via a piston rod. The piston rod is likewise arranged completely within the region of the cylinder filled with barrier fluid.

A support piston and a spring retainer plate, between which the named spring is arranged, are arranged within the barrier fluid space. The spring retainer plate is for this purpose fixedly connected to the piston rod and can be axially displaced with respect to the cylinder. The support piston is axially fixed with respect to the cylinder and has a passage through which the piston rod projects so that the piston rod can be axially displaced with respect to the support piston. For the axial fixing of the support piston, the cylinder has a peripheral shoulder at which the support piston is supported against the force of the spring.

BRIEF SUMMARY OF THE INVENTION

Against this background, it is the object of the invention to propose a sealing system which can be manufactured inexpensively and is particularly easy to handle. The object is satisfied in accordance with the invention by a sealing system.

In accordance with the invention, a cylinder end cover of the cylinder of the barrier fluid pressure device has a passage. The piston rod projects through the barrier fluid space and through the named passage and thus out of the cylinder. Only a part of the piston rod is thus arranged within the cylinder and not, as in the sealing system described above, the total piston rod. The passage and the piston rod are designed and arranged so that the piston rod can be axially displaced with respect to the cylinder base.

The cylinder can be made particularly short by the partial arrangement of the piston rod outside the cylinder, whereby the cylinder is inexpensive, on the one hand, and is light and thus simple to handle, on the other hand. The low weight of the cylinder is in particular advantageous when the barrier fluid pressure device is fastened to the pump. Due to the low weight, the influence on the dynamic behavior of the pump, for example on the vibration behavior of the pump, is particularly small.

In particular when the additional force is applied by a spring which is arranged outside the cylinder, no support piston which would have to be axially fixed is necessary within the cylinder for supporting the spring. The cylinder can thus have the same inner diameter over its total length so that the use of standard hydraulic cylinders is possible which can be obtained in a large selection and inexpensively. In addition, the required barrier fluid space is thus not unnecessarily large and the total barrier fluid is utilized for flowing through the mechanical seal arrangement. The barrier fluid amount can be set very simply by a corresponding selection of the length of the cylinder and thus of the size of the barrier fluid space.

A conclusion can be drawn on the amount of barrier fluid present in the sealing system from the position of the pressure piston and thus also of the piston rod. It is moreover particularly simply possible due to the partial arrangement of the piston rod outside the cylinder to detect the position of the pressure piston and thus the amount of barrier fluid within the sealing system by means of a visual display or of a sensor device (a so called level transducer), for example. In the above-described known sealing system, all components connected to the pressure piston are either arranged within the cylinder or are surrounded by sealing fluid.

A complex measuring apparatus is thus required for detecting the position of the pressure piston.

The mechanical seal arrangement in particular has two standard mechanical seals in a back-to-back arrangement. The lubrication film required between the sliding surfaces is built up by the barrier fluid. Commercial barrier fluids, for example in the form of hydraulic oil, can be used as the barrier fluid. The sealing arrangement has a so-called pumping ring or a pumping sleeve with a pumping thread. The barrier fluid is thus pumped through the mechanical seal arrangement so that a circulation of the barrier fluid between the mechanical seal arrangement and the barrier fluid space of the barrier fluid pressure device is achieved so that heat occurring at the mechanical seal arrangement is transported away from the mechanical seal arrangement.

The pressure difference between the sealing fluid pressure and the barrier fluid pressure set via the pressure piston can amount, for example, to between 1.0 and 4.0 bar, and in particular to between 1.4 and 3.0 bar.

In an embodiment of the invention, the additional force is applied to the pressure piston by a spring which is arranged outside the cylinder. The spring is in particular arranged between a spring retainer plate fixedly connected to the piston rod and the cylinder end cover having the passage. The additional force applied by the spring acts in the same direction as the force which acts on the pressure piston by the sealing fluid pressure. The additional force thus increases the barrier fluid pressure and thus the pressure difference between the sealing fluid pressure and the barrier fluid pressure. It is possible to provide only one spring or also a plurality of springs. The level of the additional force and thus the named pressure difference can be set by selecting the spring and/or the number of springs. Due to the arrangement of the spring outside the cylinder, the latter can be made particularly short, which has the above-described advantages. In addition, the spring is then easily accessible and can be attached or changed without having to open the cylinder.

The additional force on the pressure cylinder can also act against the force applied by the sealing fluid pressure. This is the case when the piston rod is arranged above the pressure piston in the installed state of the barrier fluid pressure device and when no spring is provided for applying an additional force in the direction of the force of the sealing fluid in gaseous state. In this case, only the weight of the piston rod and of the components connected to it, such as the spring retainer plate, acts as an additional force. In this case, the barrier fluid pressure device is also designed so that the barrier fluid pressure is greater than the sealing fluid pressure. This is possible in that the piston rod contacts the pressure piston and is fixedly connected to it and thus the surface on which the barrier fluid pressure at the pressure piston can act is smaller than the oppositely disposed surface on which the sealing fluid pressure acts. The named weight and the surface on which the barrier fluid pressure acts are matched to one another so that as a result a barrier fluid pressure results which is higher than the sealing fluid pressure.

In an embodiment of the invention, the sealing fluid space is arranged beneath the barrier fluid space in the installed state of the barrier fluid pressure device. The sealing fluid in the sealing fluid space is usually gaseous. If a leak occurs at the pressure piston and if thus barrier fluid moves into the sealing fluid space due to the higher pressure in the barrier fluid space, it can be led off easily via an outflow opening in the lower region of the sealing fluid space. In addition, a recognition of the leak is thus very easily possible.

In an embodiment of the invention, the barrier fluid pressure device has a position indicator which is arranged outside the cylinder of the barrier fluid pressure device and is connected to the piston rod. The position indicator is in particular arranged at the spring retainer plate. The position indicator can be designed as a groove in the spring retainer plate which can additionally be painted. A conclusion can very easily be visually drawn on the barrier fluid amount in the sealing system from the position of the position indicator.

A top cover is in particular connected to the cylinder. Beneath the top cover the part of the piston rod projecting from the cylinder, the named springs and the spring retainer plate, is arranged. The top cover in this respect serves only for covering and protecting the named components from elements and has no significance beyond this for the functioning of the sealing system. The top cover in particular has an elongate cut-out through which the named position indicator can be seen from outside the top cover. The cut-out is designed so that the position indicator can be seen in any position which is can adopt in the operation of the sealing system. The position indicator is thus also visible when the named components are covered. In particular markings for the position indicator which correspond to specific barrier fluid amounts are applied to the top cover. A marking for the maximum and the minimum barrier fluid amount can thus be applied, for example. A covering and thus a protection of the covered components, on the one hand, and a particularly simple visual detection of the barrier fluid amount, on the other hand, are thus possible.

In particular the cut-out is sealed by a clear sheet which can be formed as a clear plastic Acrylic Sheet. The sheet is fastened to the top cover for example with screws. So it's not possible that unwanted particles for example sand can get into the top cover.

It is also possible that a level transducer which projects into a cut-out of the piston rod is arranged at the top cover. The cut-out is in particular designed as an axial bore at the end disposed opposite the pressure piston. Since the top cover is in a fixed position with respect to the cylinder, a displacement of the piston rod with respect to the level transducer occurs on a displacement of the pressure piston and thus of the piston rod. The position of the piston rod with respect to the cylinder can thus be detected by means of the level transducer. The level transducer, for example, has a magnetic or a capacitive measuring system. The position of the piston rod and thus the barrier fluid amount can thus be electronically detected and evaluated. The measured signal can, for example, be transmitted to a monitoring computer or a master computer which monitors the barrier fluid amount and which, on the falling below of a critical amount, triggers an alarm or switches off the plant at which the sealing system is arranged, that is a pump for liquefied gas, for example.

In an embodiment of the invention, the sealing fluid space of the cylinder of the barrier fluid pressure device is connected to the sealing chamber via a connection line. Sealing fluid can thus be supplied particularly easily to the sealing fluid space and thus the sealing fluid pressure can be built up.

In an embodiment of the invention, a heat exchange device is arranged between the barrier fluid pressure device and the mechanical seal arrangement for cooling the barrier fluid. The heat exchange device can be designed, for example, as ribs at a feed line or lead-off line for the barrier fluid or as a heat exchanger which is flowed through by a cooling medium. Heat which results in a heating of the barrier fluid arises at the sliding surfaces of the mechanical seal arrangement. It can be ensured by the heat exchange device that the temperature of the barrier fluid does not increase too much. Damage to the sealing system on the basis of too high temperatures of the barrier fluid can thus be reliably avoided.

In an embodiment of the invention, the mechanical seal arrangement arrangement is arranged in a seal cartridge through which the shaft projects. An axial fan is arranged at a part of the shaft projecting from the seal cartridge and is rotationally fixedly connected to the shaft. The axial fan is designed so that it conveys air in the direction of the seal cartridge on a rotation of the shaft and thus an airflow arises along the seal cartridge. This effects a cooling of the seal cartridge and thus also of the mechanical seal arrangement arrangement.

In an embodiment of the invention, an insulation chamber is arranged at a side of the sealing chamber disposed opposite the mechanical seal arrangement arrangement. The sealing chamber is separated from the insulation segment by means of an insulation element, with a gas exchange between the sealing chamber and the insulation chamber being possible. The insulation element is designed, for example, as a disk which is sealed at its outer regions with respect to an outer wall of the insulation chamber and/or of the sealing chamber. It has a passage for the shaft which is designed so that in particular a gaseous medium can flow through between the shaft and the insulation element.

The sealing system is usually arranged at a pump so that the insulation chamber is arranged adjacent to a region of the pump from which the conveyed fluid can move into the insulation chamber. It is then the object of the sealing system to prevent an exit of the fluid moved into the insulation chamber into the environment. If the pump is used for conveying liquefied natural gas, liquefied natural gas can move into the insulation chamber in which it at least partly evaporates due to the higher temperatures in the insulation chamber. The gaseous sealing fluid which thus arises can move past the insulation element into the sealing chamber and can build up the sealing fluid pressure there. To lead off the fluid to be conveyed which does not evaporate in the insulation chamber and thus remains liquid, a lead-off line is in particular provided for the liquid fluid. The lead-off line in particular leads to the intake side of the pump. It is also prevented by the leading off of the liquid fluid that it can move past the insulation element into the sealing chamber. The lead-off line can in particular also serve as a pressure connection via which the pressure in the insulation chamber and thus also in the sealing chamber can be set. In the described example, in which the insulation chamber is connected to an intake side of the pump, the intake pressure of thee pump thus acts in the insulation chamber and so also in the sealing chamber. The barrier fluid pressure is thus set by the barrier fluid pressure device so that it has a fixed pressure difference with respect to the suction pressure of the pump.

A good thermal insulation can be ensured between the two chambers by the described arrangement of the insulation chamber with respect to the sealing chamber. It can thus be ensured that the temperatures at the mechanical seal arrangement do not become too low and thus an ideal operation of the mechanical seal arrangement is possible.

If an above-described axial fan is used at the shaft in this design, the airflow which flows along the seal cartridge and is heated in so doing results in a heating of the insulation element and thus also of the insulation chamber. This promotes the described evaporation of the fluid conveyed by the pump and contributes to a particularly effective insulation with respect to the pump.

The sealing system in accordance with the invention can in particular be arranged at a housing of a pump for conveying a liquid, in particular liquefied natural gas. The sealing system is then arranged an outlet region of a shaft in the form of the pump or drive shaft from the housing. In this respect, all the components of the sealing system do not have to be arranged at the named housing. It is, for example, possible that the barrier fluid pressure device is arranged independently of the housing.

BRIEF DESCRIPTION OF THE DRAWINGS

Further advantages, features and details of the invention result with reference to the following description of embodiments and to the drawings.

There are shown:

FIG. 1 is a sealing system arranged at a housing of a pump.

DETAILED DESCRIPTION OF THE INVENTION

In accordance with FIG. 1, a pump 10 has a pump housing 11 and a rotatable shaft 12 in the form of a drive shaft or pump shaft. The pump 10 is driven via the shaft 12 by an electric motor, not shown. The pump 10 is arranged vertically and serves for the conveying of liquefied natural gas so that liquefied natural gas can exit at a throttle bushing 13 through which the shaft 12 exits through the pump housing 11. The throttle bushing 13 is sealed with respect to the environment by means of a sealing system 9. Only details of the shaft 12 and of the pump housing 11 are shown; the representation of further components of the pump 10 has likewise been dispensed with.

A part of the throttle bushing 13 projecting from the pump housing 11 is surrounded by a cylindrical outer wall 15 of an insulation chamber 16. The outer wall 15 of the insulation chamber 16 is screwed to the pump housing 11 using a plurality of screws of which only one screw 17 is shown. The insulation chamber 16 is bounded by an insulation element 18 on the side remote from the pump housing 11, that is upwardly. The insulation element 18 is designed as a disk which has a passage 19 for the shaft 12. The insulation element 18 is sealed by seals, not shown, with respect to the outer housing 15 of the insulation chamber 16 so that no passage for a gas or for a liquid is present between the insulation element 18 and the outer housing 15 of the insulation chamber 16.

The insulation element 18 separates the insulation chamber 16 from an upwardly adjacent sealing chamber 20. The sealing chamber 20 likewise has a mainly cylindrical outer wall 21 which is screwed by means of the named screws 17 to the outer wall 15 of the insulation chamber 16 and thus to the pump housing 11.

The passage 19 of the insulation element 18 is designed so that gas can flow through between the passage 19 and the shaft 12. For this purpose, an oil retaining shield 22 is arranged at the passage 19 and surrounds the shaft 12 and projects into the sealing chamber 20. It is thus ensured that gas can admittedly move from the insulation chamber 16 into the sealing chamber 20 in the form of natural gas, but no liquid which may be located in the sealing chamber 20 in the region of the insulation element 18 can move from the sealing chamber 20 into the insulation chamber 16. The oil retaining shield 22 is arranged in the passage 19 so that neither gas nor liquid can flow through between the oil retaining shield 22 and the passage 19. So that liquid does not after all move between the oil retaining shield 22 and the shaft 12, a screen disk 23 is attached to the shaft beneath the oil retaining shield 22, that is in the insulation chamber 16, and a deflection disk is attached above the oil retaining shield 22, that is in the sealing chamber 20. The diameters of the screen disk 23 and of the deflection disk 24 are in this respect each greater than the diameter of the oil retaining shield 22.

Liquefied natural gas can exit from the pump 10 via the throttle bushing 13 into the insulation chamber 16. The liquefied natural gas evaporates at least partly there so that the insulation chamber 16 is filled with liquefied natural gas and with gaseous natural gas. To lead off the collecting liquefied natural gas, the insulation chamber 16 has a lead-off opening 25 in its outer wall 15 which is connected to a lead-off line 26. The lead-off line 26 leads to an intake side of the pump 10, not shown, at which a so-called intake pressure of the pump 10 is present. The intake pressure is also present in the insulation chamber 16 due to this connection.

A mechanical seal arrangement 27 upwardly adjoins the sealing chamber 20 in the axial direction of the shaft 12. The mechanical seal arrangement 27 has a seal cartridge 28 which is screwed to the outer wall 21 of the sealing chamber 20. Two standard mechanical seals in a back-to-back arrangement 29 are arranged at the shaft 12 within the seal cartridge 28, with no details being shown. The mechanical seals 29 have a pumping ring, not shown further, for pumping barrier fluid through the mechanical seals 29.

The seal cartridge 28 is sealed with respect to the outer wall 21 of the sealing chamber 20 by means of an O-ring which is not shown. However, small amounts of barrier fluid can exit the mechanical seal arrangement 27 in the region of the shaft 12 and can move into the sealing chamber 20. This can in particular occur since the pressure of the barrier fluid, that is the barrier fluid pressure, is larger than the pressure of the sealing fluid, that is of the natural gas, in the sealing chamber 20. If barrier fluid moves along the shaft 12 from the mechanical seal arrangement 27 into the sealing chamber 20, the barrier fluid drips onto the rotating deflection disk 24 and is hurled by it outwardly toward the outer wall 21 of the sealing chamber 20. It is thus ensured that no barrier fluid can enter into the oil retaining shield 22 and thus into the insulation chamber 16. The barrier fluid exiting along the shaft 12 collects in the sealing chamber 20; however, due to the oil retaining shield 22 it cannot move further into the insulation chamber 16. An opening 30 which is closed by a plug 31 is provided in the outer wall 21 in the lower region of the sealing chamber 20. The collected barrier fluid can be let out of the sealing chamber 20 via this opening 30. It is also possible to provide a line here via which the barrier fluid can flow off continuously. In this case, a conclusion could be drawn via the detection of the amount of barrier fluid which has flowed out on an unpermitted leak at the mechanical seal arrangement 27 or, as described further below, at a barrier fluid pressure device 33.

An axial fan 32 which is rotationally fixedly connected to the shaft 12 upwardly adjoins the seal cartridge 28 in the axial direction of the shaft 12. The axial fan 32 is designed so that an airflow arises along the seal cartridge 28 in the direction of the insulation element 18 or insulating chamber 16 during the operation of the pump 10, that is with a rotating shaft 12. A cooling of the seal cartridge 28 and thus also of the mechanical seal arrangement 27 is thus achieved, on the one hand, and a heating of the insulating element 18 and of the insulation chamber 16 is achieved, on the other hand.

An electric motor, not shown, which drives the shaft 12 and thus serves for the drive of the pump 10, adjoins the axial fan 32.

The sealing system 9 moreover has a barrier fluid pressure device 33 already briefly mentioned above. The barrier fluid pressure device 33 has a cylinder 34 with a top cylinder end cover 35 and an bottom cylinder end cover 36, with the two cylinder bases 35 and 36 being screwed to one another outside the cylinder 34 and the cylinder 34 thus being clamped between the two cylinder end covers 35, 36. The cylinder 34 is designed as a standard hydraulic cylinder. A pressure piston 37 which divides the cylinder 34 into a sealing fluid space 38 and into a barrier fluid space 39 is arranged in the cylinder 34. In this respect, in the installation state of the barrier fluid pressure device 33, as shown in FIG. 1, the sealing fluid space 38 is arranged beneath the barrier fluid space 39. If a leak should arise at the pressure piston 37, only barrier fluid can enter into the sealing fluid space 38 due to the barrier fluid pressure which is higher than the sealing fluid pressure; an exit of sealing fluid is not possible. If barrier fluid moves into the sealing fluid space, it can flow via a connection line 40 described in more detail further below to the sealing chamber 20 and can be led off there via the opening 30 in the outer wall 21 of the sealing chamber 20.

The sealing fluid space 38 is connected by the connection line 40 to the sealing chamber 20 so that the sealing fluid pressure and thus the intake pressure of the pump 10 acts in the sealing fluid space 38. The barrier fluid space 39 is connected to the mechanical seal arrangement 27 via a feed line 41 and via a lead-off line 42. The pumping ring of the mechanical seal arrangement 27 is designed so that the barrier fluid is pumped from the mechanical seal arrangement 27 via the lead-off line 42 to the barrier fluid space 39 and from there back to the mechanical seal arrangement 27 again via the feed line 41. The top cylinder end cover 36 has the connections and passages required for this. Cooling ribs 43 are arranged at the feed line 41 which serve for the cooling of the barrier fluid. In addition, corresponding cooling ribs can also be provided at the lead-off line 42. It is also possible that a heat exchanger is arranged at one or both lines.

The pressure piston 37 is screwed to a piston rod 44 which is aligned in the axial direction of the cylinder 34 and extends through the barrier fluid space 39 and through the top cylinder end cover 36. The top cylinder end cover 36 for this purpose has a passage 45 in which seals and a bushing, not shown in more detail, are arranged. A spring retainer plate 46 is screwed to the end of the piston rod 44 disposed opposite the pressure piston 37. Two springs 47, 48 arranged coaxially to the piston rod 44 are clamped between the spring retainer plate 46 and the top cylinder end cover 36, with the springs 47, 48 only being partly shown for reasons of clarity. The two springs 47 and 48 exert an additional force on the pressure piston 37 via the piston rod 44. It is also possible that only one spring or no spring at all is provided.

An upper part of the top cylinder end cover 36, the upper part of the piston rod 44 and the springs 47, 48 are arranged beneath a top cover 49 which is seated on the top cylinder end cover 36 and is connected to it. The top cover 49 has an elongate cut-out 50 through which a position indicator 51 in the form of a painted groove in the spring retainer plate 46. The position of the spring retainer plate 46 can also be read off by means of the position indicator 51 with a top cover 49 placed on so that a conclusion can be drawn on the amount of barrier fluid contained in the barrier fluid space 39 and thus in the entire sealing system 9.

The cut-out 50 is sealed by a clear plastic Acrylic Sheet. The sheet is fastened to the top cover for with not shown screws.

In addition, a level transducer 52 is arranged at the top cover 49 by means of which the position of the piston rod 44 can be electronically detected. For this purpose, the level transducer 52 has a rod 53 which proseats into a bore 54 of the piston rod 44. The level transducer 52 can determine how far the rod 53 proseats into the bore 54 and from this can determine the position of the piston rod 44 and thus of the pressure piston 37. This information can be transmitted to a monitoring computer or master computer in the form of a measured signal via signal lines, not shown.

The barrier fluid pressure in the barrier fluid space 39 and thus also in the feed line 41, in the mechanical seal arrangement 27 and in the lead-off line 42 can be set by means of the force acting in the direction of the barrier fluid space 39 on the pressure piston 37. This force is predominantly composed of the force acting on the basis of the sealing fluid pressure in the sealing fluid space 38 and of the force of the springs 47 and 48 introduced via the piston rod 44 and acting in the same direction. The barrier fluid pressure is set in this respect that a force balance is present at the pressure piston 37. In this respect, the surfaces on which the pressures can act also play a role in addition to the sealing fluid pressure, to the barrier fluid pressure and to the additional force. In the described design, a barrier fluid pressure results which is larger by a fixed pressure difference than the sealing fluid pressure. The surfaces and the springs 47, 48 are in particular selected so that a pressure difference between 1.4 and 3.0 bar results.

The invention claimed is:

1. A sealing system for sealing a rotating shaft projecting through a sealing chamber, comprising:
    a mechanical seal arrangement, wherein a barrier fluid at a barrier fluid pressure flows through the mechanical seal arrangement;
    a barrier fluid pressure device which has a pressure piston which is displaceable in a cylinder and by means of which the barrier fluid pressure is set; and
    a position indicator which is arranged outside the cylinder of the barrier fluid pressure device and is connected to the piston rod,
    wherein
    the position indicator is arranged at a spring retainer plate connected to the piston rod;
    the cylinder has a cylinder end cover and is divided by the pressure piston into a sealing fluid space in which a sealing fluid pressure acts and into a barrier fluid space which is flowed through by the barrier fluid;
    the barrier fluid space is connected to the mechanical seal arrangement via a feed line for introducing the barrier fluid into the mechanical seal arrangement and a lead-off line for discharging the barrier fluid from the mechanical seal arrangement;
    the barrier fluid pressure is greater than the sealing fluid pressure of a sealing fluid acting in the sealing chamber;
    the sealing fluid pressure and an additional force act on the pressure piston of the barrier fluid pressure device for setting the barrier fluid pressure; and
    the additional force acts on the pressure piston via a piston rod connected to the pressure piston,
    wherein
    the cylinder end cover has a passage and the piston rod projects through the barrier fluid space and the passage of the cylinder end cover and thus projects out of the cylinder.

2. A sealing system in accordance with claim 1, wherein the additional force is applied by a spring which is arranged outside the cylinder.

3. A sealing system in accordance with claim 2, wherein the spring is arranged between a spring retainer plate connected to the piston rod and the cylinder end cover having the passage.

4. A sealing system in accordance with claim 1, wherein the sealing fluid space is arranged beneath the barrier fluid space in the installed state of the barrier fluid pressure device.

5. A sealing system in accordance with claim 1, wherein a top cover is connected to the cylinder which has a cut-out with the cut-out being arranged with respect to the position indicator such that the position indicator can be seen from outside the top cover.

6. A sealing system in accordance with claim 5, wherein the cut-out is sealed by a clear sheet.

7. A sealing system in accordance with claim 1, wherein the cylinder is connected to a top cover at which a level transducer is arranged which projects into a cut-out of the piston rod so that a position of the piston rod can be detected.

8. A sealing system in accordance with claim 1, wherein the sealing fluid space of the cylinder of the barrier fluid pressure device is connected to the sealing chamber via a connection line.

9. A sealing system in accordance with claim 8, wherein a heat exchange device is arranged between the barrier fluid pressure device and the mechanical seal arrangement for cooling the barrier fluid.

10. A sealing system in accordance with claim 1, wherein the mechanical seal arrangement is arranged in a seal cartridge through which the shaft projects and an axial fan is arranged at a part of the shaft projecting out of the seal cartridge.

11. A sealing system in accordance with claim 1, wherein an insulation chamber is arranged at a side of the sealing chamber disposed opposite the mechanical seal arrangement and the sealing chamber is divided from the insulation chamber by means of an insulation element, with the insulation element being designed so that a gas exchange is possible between the sealing chamber and the insulation chamber.

12. A sealing system in accordance with claim 11, wherein the insulation chamber has a lead-off opening via which a pressure is set in the insulation chamber.

13. A pump for conveying a fluid comprising a housing and a drivable shaft, wherein a sealing system in accordance with claim 1 is arranged at an outlet region of the shaft from the housing.

* * * * *